Feb. 27, 1968

R. C. WRIGHT 3,370,523

BEVERAGE DISPENSING APPARATUS

Filed May 20, 1966

INVENTOR.
ROBERT C. WRIGHT
BY
Symestvedt & Lechner
ATTORNEYS

Feb. 27, 1968
R. C. WRIGHT
3,370,523
BEVERAGE DISPENSING APPARATUS
Filed May 20, 1966
3 Sheets-Sheet 3
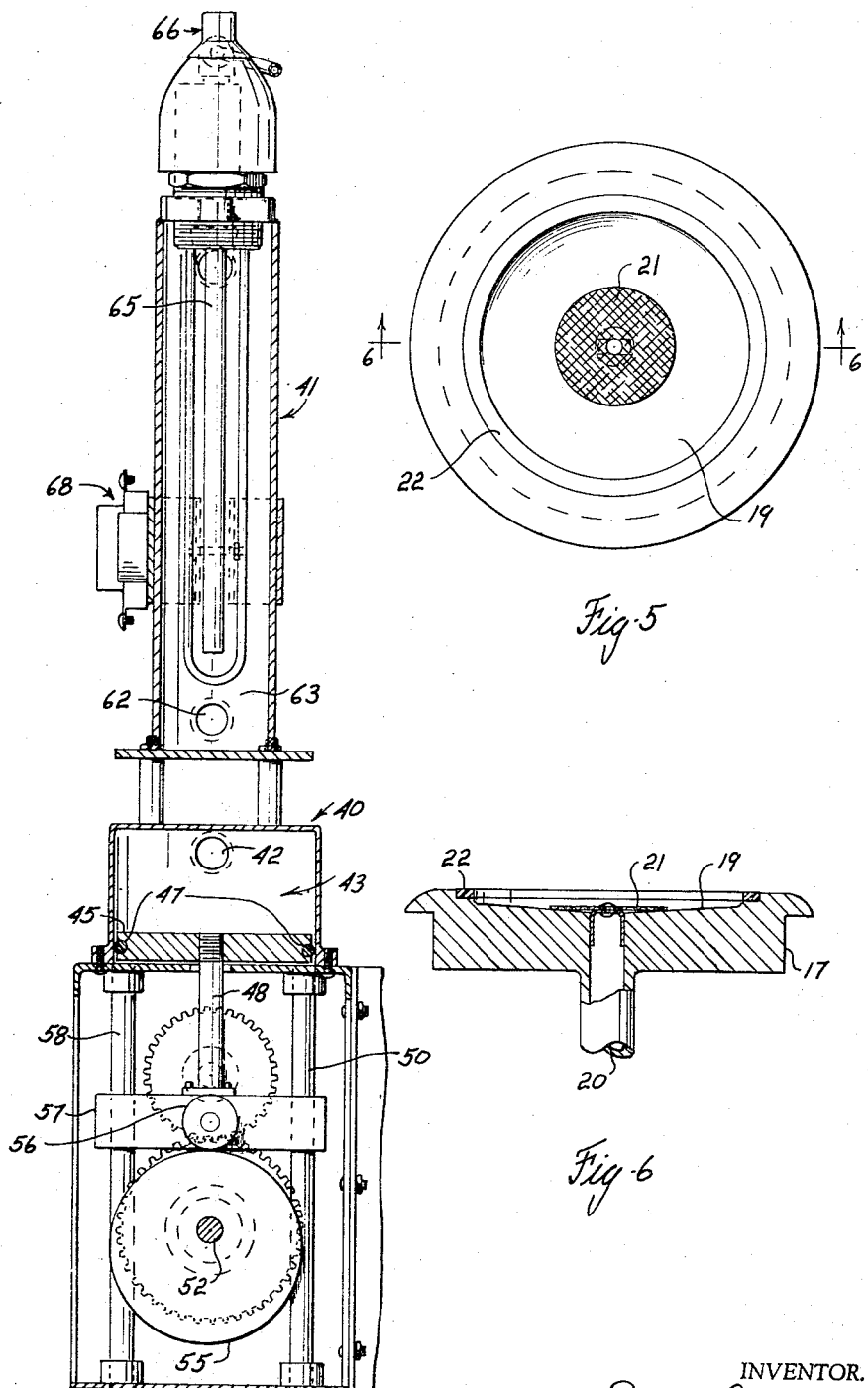
INVENTOR.
ROBERT C. WRIGHT
BY
Synnestvedt & Lechner
ATTORNEYS

United States Patent Office 3,370,523
Patented Feb. 27, 1968

3,370,523
BEVERAGE DISPENSING APPARATUS
Robert C. Wright, Huntingdon Valley, Pa., assignor to Rudd-Melikian, Inc., Warminster, Pa., a corporation of Pennsylvania
Filed May 20, 1966, Ser. No. 551,674
7 Claims. (Cl. 99—282)

This invention relates to an apparatus for brewing hot beverages by an extraction process. Although not limited thereto, the invention is especially useful in the preparation of individual servings of so-called espresso coffee from freshly ground coffee bean.

An important feature of the invention lies in the provision of apparatus for brewing espresso coffee or other hot, strongly flavored beverage from pods or cartridges of beverage material which are spaced along a tape and wherein the pods or cartridges are encapsulated in a permeable material such as a filter paper. Suitable tapes for use in conjunction with the apparatus are disclosed in United States Patent No. 3,186,137 and United States patent application Ser. No. 529,554, filed Feb. 23, 1966, and assigned to the assignee of this application. Although the invention is adaptable to the preparation of larger quantities of coffee from larger cartridges, it is preferred that the cartridges on the tape contain just enough beverage material to make a single serving.

A related object of the present invention is the provision of brewing apparatus which is capable of extracting an extremely high proportion of the beverage extract from the ground beverage material in a convenient length of time.

Another object of the invention is the provision, in a beverage brewing machine, of a control system for always maintaining the supply of brewing liquid at a relatively high, precisely controlled, brewing temperature very close to the boiling point and at a pressure well above atmospheric, even when the apparatus is connected to a low pressure source of water.

A still further object of the invention is the provision of a brewing apparatus having a capability of consistently brewing espresso coffee at high temperatures without burning the coffee and without destroying the foam layer characteristic of espresso coffees.

Still another object of the invention is the provision of an extremely compact form of brewing apparatus, well suited for vending machine use.

The above and various other objects and advantages of the invention are achieved by a pair of brewing chamber members arranged for relative movement toward and away from a position of engagement with one another in which they form a beverage extraction chamber. One of the members is provided with an inlet port for the introduction of hot water into the chamber and the other member has an outlet port for the discharge of extract therefrom. Means are provided for conveying a beverage material in the form of tightly compressed briquettes covered with a permeable material and carried on a tape through the apparatus and for sequentially positioning successive cartridges between the relatively moveable brewing members. A pump is provided comprising a cylinder, a piston mounted for slideable movement therein and a motor which is connected to the piston to reciprocate the piston through the cylinder. A water line connects one end of the cylinder to a source of water at line pressure and a valve in the line admits a cup-sized quantity of water to the cylinder at a selected portion of the operating cycle. The cylinder is in turn connected to a boiler chamber which is provided with a heater for maintaining a supply of water in the boiler at a temperature above its boiling point and at a pressure above atmospheric. An outlet line connects the boiler to the extraction chamber inlet port. A discharge valve in the outlet line is opened during the pumping stroke so that the pump displaces hot water from the outlet line into the extraction chamber. Each beverage cartridge is sufficiently compressed to provide sufficient resistance to flow during the pumping stroke of the piston whereby extraction rapidly takes place under conditions of relatively high pressure and temperature near the boiling point.

The preferred manner of achieving the objects and advantages of the invention will be fully apparent upon reference to the following detailed description of an illustrative embodiment of the invention in which:

FIGURE 4 is a sectional view of the structure shown in FIGURE 3, taken along lines 4—4 of FIGURE 3, with certain portions of the structure being removed for clarity of illustration;

FIGURE 5 is a detailed view showing the lower brewing or extraction chamber member used in the embodiment of the invention shown in FIGURES 1 through 4; and FIGURE 6 is a sectional view taken along line 6—6 of FIGURE 5.

Figure 2:
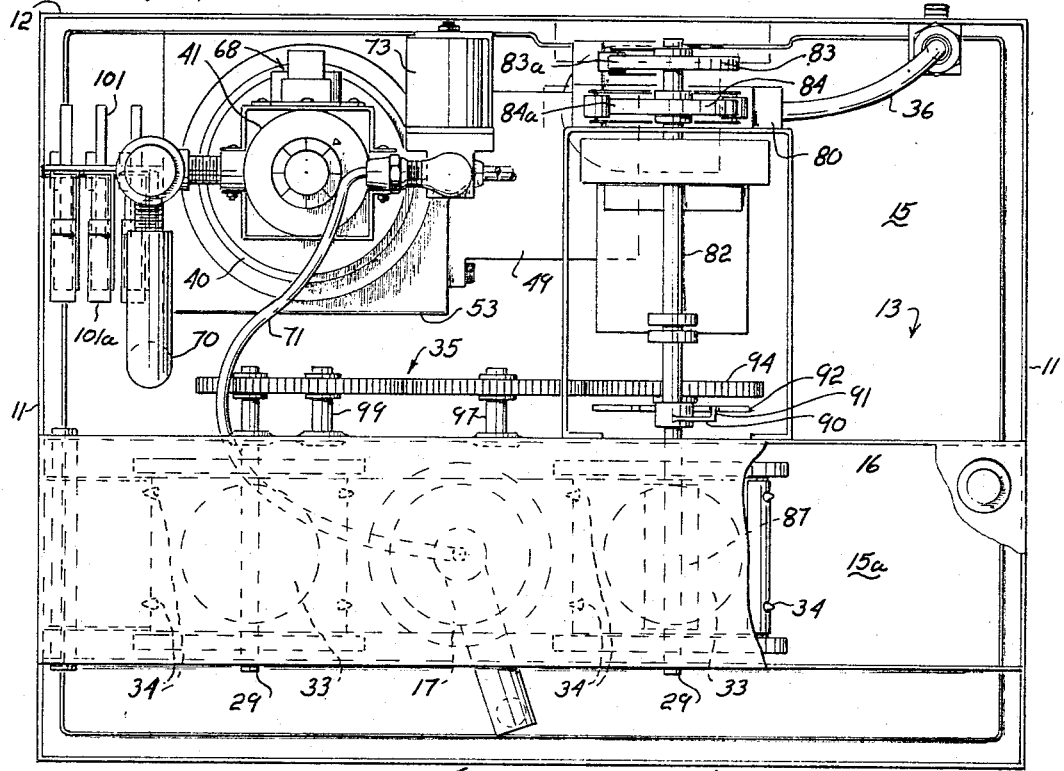
FIGURE 2 is a plan view of the brewing structure of FIGURE 1.
Figure 1:
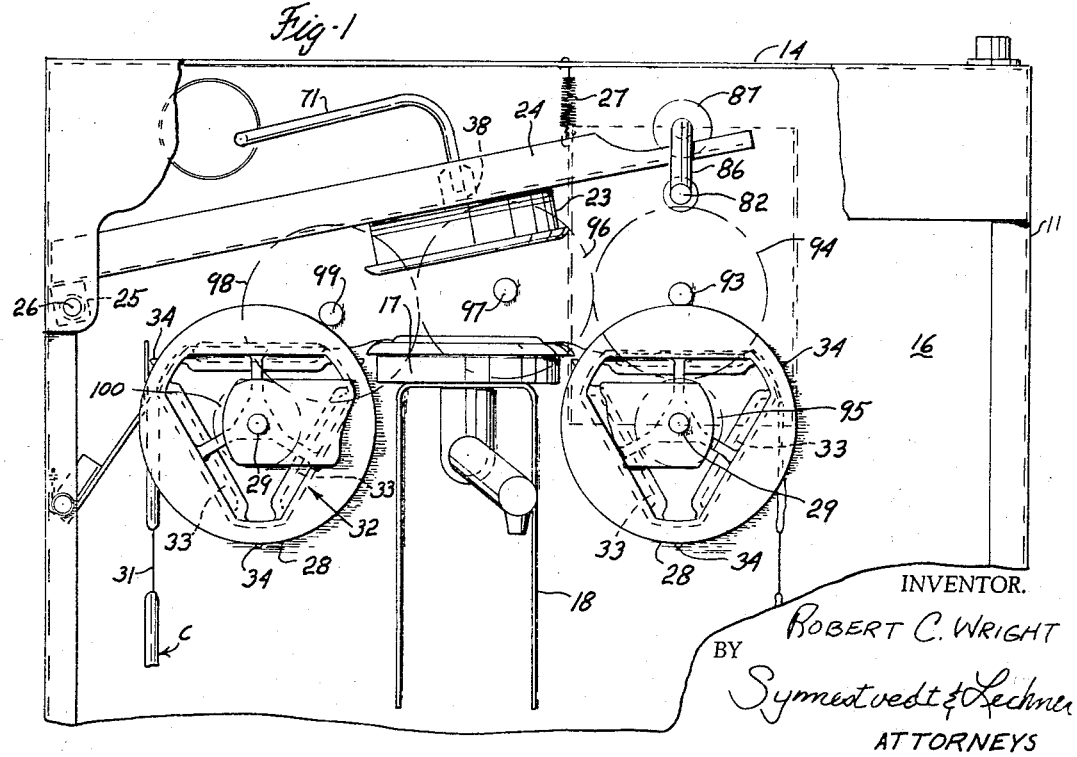
FIGURE 1 is a fragmentary view showing in elevation the upper portion of a brewing structure formed in accordance with the teachings of the invention.
Figure 3:
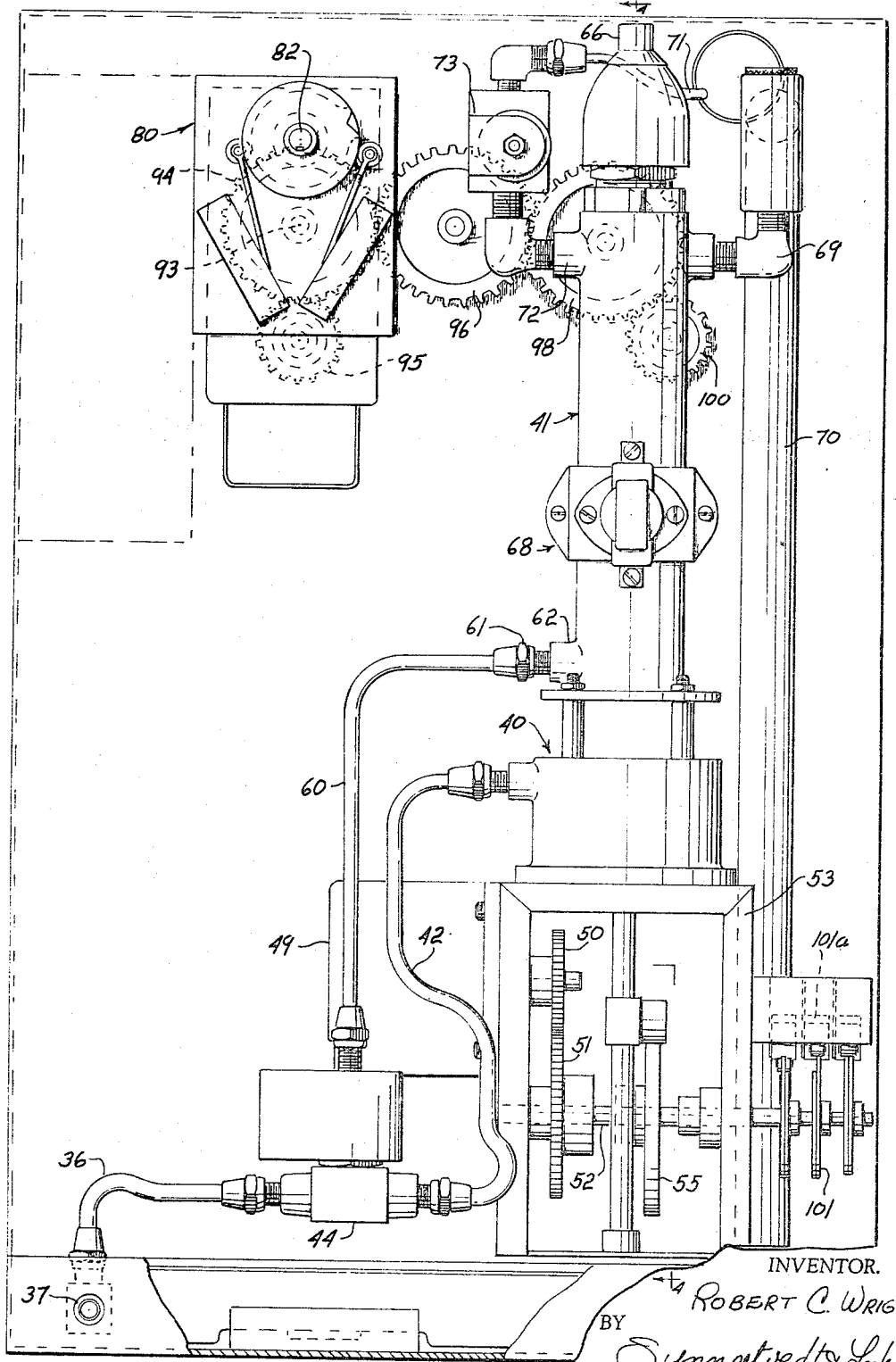
FIGURE 3 is a rear elevational view of the structure shown in FIGURES 1 and 2.

Attention is first directed to FIGURES 1 through 3. The preferred embodiment of the brewer shown in these figures is preferably mounted in a rectangular box-like cabinet 10 which includes side walls 11, a rear wall 12, a base 13 and a top wall 14. The cabinet is preferably divided into front and rear sections 15 and 15a by means of a partition 16.

In general, the portion of the apparatus forming the beverage extraction chamber is mounted in the front portion 15a of the housing whereas the apparatus for supplying water to the extraction chamber at the correct temperature and pressure, as well as the control apparatus for the brewer is located in the rear compartment 15.

Turning now to FIGURE 1, the preferred form of brewing apparatus comprises a lower brewing member 17, which is mounted on a U-shaped bracket 18 secured by welding to the partition 16.

As is best shown in FIGURES 5 and 6, brewing member 17 is provided with an annular dished depression 19 and a drain 20. Drain 20 extends downwardly (see FIGURE 1) and leads to cup station, not shown, at which a cup is placed to receive the hot beverage just before the extraction operation. A screen 21 covers the drain. The screen is preferably between a 30 and 50 mesh screen in order to provide sufficient resistance to flow for reasons which will appear hereinafter. An annular sealing ring 22 extends around the circumference of the depression 19.

The remainder of the brewing chamber is formed by a second brewing member 23, mounted on an arm 24 pivotally mounted on a shaft 25 carried by partition 16 and a bracket 26. A spring 27 urges the pivot arm 24 to the raised position shown in FIGURE 1. Mechanism, to be described, pulls the pivot arm 24 downwardly until the brewing member 23 is firmly held in engagement with the sealing ring 22 in lower brewing member 17 at the commencement of the brewing cycle.

Indexing wheels 28 are secured by shafts 29 on either side of the lower brewing member 17. The indexing wheels are rotated in unison by indexing mechanism described hereinafter and index cartridges C carried on a tape 31 to the brewing chamber and to simultaneously convey the spent cartridges previously in the brewing chamber to a waste container, not shown, but located somewhere beneath the right hand indexing wheel 28 at the lower left hand corner of the cabinet.

The beverage cartridges C mentioned above may be formed in various ways and assume a variety of configurations. A typical cartridge carrying tape which may be used in connection with the apparatus of the present invention is disclosed in Patent No. 3,186,137, issued June 1, 1965, to A. D. Eitzen and assigned to the assignee of this application. As mentioned in that patent, it is important that coffee be compressed to form a uniform and relatively dense briquette in the cartridge or pod and that the paper making up the tape be pressed into tight contiguity with the entire surface of the briquette. Furthermore, the two runs of paper which make up the briquette described in the above patent must be adhesively bonded in a circumferential zone which extends completely around the briquette with the volume enclosed by the paper within the adhesively bonded portions being precisely equal to the volume of the compressed briquette. In the brewing of espresso coffee, I have found that it is even more important, than is the case in the brewing of so-called "American style" coffee, that the briquette be quite dense.

In the feeding of tape, it is very important that the tape be advanced by a precise amount, so that the cartridges C are always located in the correct position on the lower brewing member 17. If the tape is indexed so that a cartridge is not precisely located within the dished recess 19 and the lower brewing member 17, the brewing chamber may not seal properly when the upper brewing member 21 moves downwardly. For this reason, indexing means in the form of indexing holes are provided on the tape 31 at the uniform intervals in preselected positions with respect to the cartridges C.

As shown in FIGURE 1, each indexing wheel is provided with triangular prism-shaped indexing members 32. A shallow cartridge receiving cavity 33 is provided in each face of the triangularly shaped indexing members. Indexing pins 34 are located at the corners of each of the triangularly shaped indexing members. The indexing members are driven by a gear train generally indicated at 35 in FIGURE 2, and described hereinafter, which moves the indexing members and hence the indexing pins from the position shown in FIGURE 1 exactly 120° during each operating cycle. This advances a cartridge into a position of precise alignment with the brewing members 17 and 23 so that the cartridges do not interfere with the proper sealing of the brewing chamber once the brewing operation begins.

Upper brewing member 23 is provided with water inlet port for the supply of hot water to the brewing chamber. The water is supplied by the apparatus generally located in the rear of the cabinet including a pump 40 and a boiler 41. Water is supplied to the pump through a line 36 which leads from a coupler 37 which is adapted to be connected to a suitable water supply, for example, the water supply line of the building in which the brewer machine is located. A valve 44 connects the line 36 to the pump via a line 42.

As shown in section in FIGURE 4, pump 40 is preferably a piston operated pump and is provided with a cylinder 43 in which is mounted a piston 45. Piston 45 is adapted to be reciprocated between the position viewed in FIGURE 4 and a raised position in which the water in the cylinder is driven out through line 42.

The piston is provided with a sealing ring 47 in order to prevent seepage of water around the piston and is driven by a piston rod 48. A motor 49 is mounted in the lower part of the cabinet. The motor shaft drives a reduction gearing including gears 50 and 51. Gear 51 is secured to a shaft 52 journalled in upright supports 53 and 54. A cam 55 is also secured to the shaft 52. A cam follower 56, mounted for rotation on a guide bracket 57, rides on the surface of cam 55. The guide bracket is slideably mounted on a pair of vertically arranged, spaced guide rods 58. Piston rod 48 is bolted to the guide bracket 57 so that rotary movements of the cam are directly transformed into reciprocatory movements of piston 45.

From the foregoing, it may be seen that during the pumping stroke, the piston moves from the position shown upwardly to a position in which the water in the cylinder is forced out through the line 42. This takes place during the first 180° of rotation of shaft 52. During the next 180° of rotation of shaft 52, the piston is free to return to its lower retracted position and will do so as water under line pressure again enters the cylinder later in the cycle.

In the preferred embodiment, valve 44 is solenoid operated and is of the two way type alternately providing communication from line 36 to line 42 or from line 42 to line 60. When in the latter position, which is the position occupied by the valve after the cylinder 43 is filled, the cylinder is in direct communication with the interior of the boiler via line 60 and a fitting 61 connected to a port 62 at the bottom of the boiler.

As is shown in FIGURE 4, the boiler is provided with a boiler chamber 63 which preferably has a capacity of from two to three times that of the pump cylinder 43. In this manner an adequate supply of hot water is always available for brewing purposes.

Heater 65, of the immersion type, is positioned in the chamber 63. The heater means 65, preferably an electrical heater, is provided with a thermostatically controlled heat regulator 66 of conventional construction which is pre-settable to the desired boiler temperature. I have found that the boiler temperature should be maintained at from 235° to 250° F., at which point the pressure in the boiler will be about 17 p.s.i.g. Once the preselected temperature is reached, the heater will operate intermittently, supplying heat as required to maintain the water at that temperature.

As a safety precaution, I bolt a thermostat 68, preferably of the snap-disc type, on the outside of the boiler 41. Suitable circuit means, not shown, are provided to disconnect the heater in response to operation of thermostat 68 should the temperature in the boiler rise to a level at which a safety hazard may exist. The boiler is also preferably provided with an overflow line 69 in which a suitable fused plug or pressure relief valve is installed. The arrangement is designed to provide a communication with atmosphere through a line 70 which leads to the bottom of the brewer should the thermostats fail to respond, so that the boiler pressure reaches an unsafe level. In that event, the steam will be exhausted to a suitable collection tray at the bottom of the unit.

An outlet line 71 is connected to a fitting 72 to the top of the boiler through a solenoid operated valve 73. Line 71 leads to the upper brewing member 23 as may be seen most clearly in FIGURES 1 and 2.

A greater portion of the line 71 is preferably made of a plastic material such as polypropylene in order to prevent excessive heat losses as the water flows from the boiler to the brewing chamber. In addition, the portion of the line downstream from the valve 73 should have a reduced inside diameter, for example, 0.05 inch, in order to restrict the amount of water in that portion of the line as much as possible at any given time. Reasons for this will appear hereinafter.

The operation of the hot water control system so far described can best be understood starting at the point of time when the piston is at the top of its stroke, that is, immediately after a preceding infusion operation has taken place. At this time, valve 44 is operated by suitable circuitry to provide a connection through line 42 from the building water supply to the piston cylinder 43. Water is fed into the cylinder under line pressure. At the same time, motor 49 rotates cam 55 from the position in which the high point on the cam surface is in engagement with the follower to the position in which the low point on the cam surface engages the follower. The water under line pressure pushes the piston downwardly filling the chamber 43 with water.

In the preferred embodiment, chamber 43 has a somewhat larger capacity than the quantity of water to be fed into the chamber for reasons which will appear hereinafter.

The piston is now ready to begin its forward pumping stroke and in order to pump water into the boiler, valve 44 is operated to connect line 42 to line 60. Subsequently, motor 49 rotates the cam shaft 52 and drives the piston upwardly, expelling the water from the cylinder out through line 42 and through line 60 into the boiler 41. At the start-up of operations, it will generally be necessary to cycle the pump several times, depending upon the relative capacities of the pump and the boiler. In the illustrative embodiment, the boiler holds about three times as much water as the pump cylinder so that the boiler is completely filled following three pumping cycles. At this point, the heater 65 is turned on by setting the heat regulating knob 69 to the desired temperature, typically 235° to 250° F. The water in the boiler is thereupon heated to the desired level and the apparatus is ready for operation. Thereafter, each time pump 40 delivers a charge of cold water to the boiler, an equal volume of hot water will be forced out through outlet line 71.

Although one motor could be used to drive both the pump and the indexing mechanism, in the preferred embodiment of the invention, I have used a second motor 80 for operating the indexing mechanism and for providing the energy to seal the brewing chamber parts. To accomplish this, motor 80 is provided with a drive shaft 82. One end of shaft 82 carries a crank arm 86 which is positioned on the front side of the partition 16. A roller 87 is mounted on the end of the crank arm. Upon rotation of shaft 82 through a full revolution, the crank first depresses the pivot arm 24 to bring the upper brewing member 23 into sealing engagement with the lower brewing member 17, thereby forming a closed brewing chamber. During the latter portion of the revolution of the shaft 82, the roller 87 rises and the spring 27 draws the brewing member 23 away from the brewing member 17, thereby opening the brewing chamber.

Also secured on shaft 82, just behind the partition 16, is a geneva driving member 90 shown in plan in FIGURE 2. A pin 91 is mounted on the end of the driving member 90. The pin is adapted to engage radial slots in a geneva wheel 92. Geneva wheel 92 is mounted on a shaft 93 located just beneath shaft 82 (FIGURES 1 and 3). A drive gear 94 of the drive train 35 is also secured to the shaft 93. Gear 94 meshes with a gear 95 mounted on the stub-shaft 29. Also meshing with the gear 94 is a gear 96 journalled on a stub-shaft 97. The gear 96 drives a gear 98 journaled on a sub-shaft 99, which in turn drives a pinion 100 secured to the left hand indexing shaft 29 as viewed in FIGURE 1.

The geneva wheel driven gear train provides a means for accurately indexing the indexing members 32 by exactly rotating these members 120° during each complete revolution of shaft 82.

The other end of shaft 82 carries cycle control cams 83 and 84 which regulate the opening and closing of switches 83a and 84a respectively. The switches connect the pump motor 49 and the solenoid for discharge valve 73 with the power supply at the required times during an operating cycle.

A typical operating cycle of the apparatus so far described will now be set forth, starting from the point at which the boiler is filled with water, the pump cylinder 43 is filled with water and valve 44 has been operated to connect the pump cylinder with the boiler. At this point in the cycle, the brewing members are in the position shown in FIGURE 1 and the indexing members have previously positioned a pod or cartridge in the dished cavity in lower brewing member 17. A brewing cycle is now initiated, either by depositing a coin, if the apparatus is designed for vending machine operation, or by closing a suitable button operated switch. In either event, a circuit is closed which energizes the motor 80, so that the motor rotates shaft 82, turning crank 86 to draw the upper brewing member 23 downwardly to establish a firm seal with lower brewing member 17. At this point in the cycle, cam 83 on shaft 82 closes switch 83a, which connects the motor 49 to the power supply. Cam 84 closes switch 84a and this energizes the solenoid for solenoid operated valve 73 thereby opening this valve. During the pumping stroke of the piston 45, cold water is forced from the pump cylinder through line 42 through the valve 44 up through line 60 into the bottom of boiler 41. The cold water in turn forces the hot water at the top of the boiler through line 71 into the brewing chamber.

Beacuse each pod C is densely packed, considerable resistance to flow is encountered in the brewing chamber. Pump motor 49 should develop sufficient torque so that the pressure generated on the pumping stroke of the pump builds up from a boiler pressure of around 17 p.s.i. to about 60 p.s.i. This pressure is maintained throughout a substantial portion of the brewing cycle, a factor which I have found to be very important in brewing of good tasting espresso coffee. The resistance to flow can also be controlled by the fineness of the mesh screen mounted in the lower brewing member 17. A 30 mesh screen with a diameter of 7/8 inch produces excellent results, however, the mesh size may vary according to the density of the grind. A few field tests will readily establish these variables.

The hot water displaced by the operation of the pump is forced through pod C and the beverage is extracted. When the piston reaches the top of its stroke, the cam 84 again closes switch 84a to close the discharge valve 73. Thereafter, a cam 101 driven on shaft 52 for the motor 49 closes the switch 101a which switches valve 44 to the position in which the water supply line is connected to the cylinder 43. As the water flows into the cylinder, continued rotation of the motor 49 retracts the piston until the cylinder 43 is refilled in preparation for the next operation cycle.

As pointed out above, it is important that the line 71 be of relatively small diameter so that the smallest amount of water practicable is present in the line following closure of the discharge valve 73. This arrangement eliminates the danger of large amounts of hot water flashing to steam when the brewing chamber parts separate. I have found that such an arrangement is extremely beneficial because it eliminates the flashing of the large amounts of water to steam when the brewing chamber parts separate. If flashing of considerable water did occur, the released energy could rupture the pod, creating considerable messiness in the machine and possibly interfering with tape indexing.

As noted above, the pump has a capacity somewhat larger than that required for the 50 milliliter volume of water normally delivered to it from the supply line. This provides room for expansion whenever the pump is connected to the boiler. Thus, between cycles of operation of the apparatus, as expansion occurs due to the heat and pressure in the boiler, the piston will be moved down slightly until the piston cam follower engages its cam.

I have found that although it is important that fusion take place at as high a temperature as possible for maximum extraction, if the temperature rises above 212° F., much of the flavor of the espresso coffee is destroyed. In addition, the extraction at temperatures above 212° destroys the natural foaming agents in the espresso coffees. While this does not impair the flavor of the coffee, drinkers of espresso are accustomed to such foam and consider the beverage to be inferior if it does not have the foam. In view of this, it is considered critical that the temperature be maintained very close to, but just below 212° F., in the brewing chamber.

The establishment of a high, relatively constant pressure throughout much of the brewing cycle is an important factor in maintaining the temperature at the desired level. The high pressure level also ensures that brewing will take place in a short period of time. This is also a critical factor especially when dealing with the 50 milliliter sized cups of beverage popular with drinkers of espresso. The apparatus of the invention has proven to be very efficient in this regard, in that a cup of espresso can ordinarily be brewed in about twenty seconds' time.

I claim:

1. In apparatus for sequentially brewing beverages from liquid permeable dense, compressed pods of beverage material carried in spaced relation along a tape, said apparatus comprising a pair of brewing members arranged for relative movement toward and away from a position of engagement with one another in which they cooperate to define a beverage extraction chamber, and wherein one of said members has an inlet port for the introduction of hot water thereinto and the other has an outlet port for the discharge of extract therefrom, and means for conveying said tape through said apparatus and for sequentially positioning successive pods between said relatively moveable members; a pump comprising a cylinder, a piston slideably mounted therein and a motor therefor, a water line adapted to be connected to an outside source of water under line pressure connected to said cylinder adjacent one end thereof, an inlet valve in said line for selectively admitting water from said outside source to fill said cylinder with a cup-sized quantity of water, a boiler having a boiler chamber and a heater therefor for maintaining a supply of water at a temperature above its boiling point and at a pressure above atmospheric, a line for connecting said pump cylinder and said boiler chamber, an outlet line connecting said boiler chamber to said extraction chamber inlet port, a discharge valve in said outlet line, means for closing said discharge valve when the pump cylinder is being filled and for thereafter opening the discharge valve when said brewing members are in said position of engagement, a motor for driving said piston to progressively reduce the volume of water in said cylinder, thereby displacing an equivalent volume of water in said boiler out through said outlet line, and means in said brewing chamber including each successive compressed pod for offering sufficient resistance to flow whereby extraction takes place at a pressure substantially above atmospheric.

2. Apparatus according to claim 1, wherein said boiler chamber has a greater capacity than said pump cylinder.

3. Apparatus according to claim 2, wherein the line connecting the pump and the boiler chamber leads into the bottom of the boiler chamber and the outlet line is connected to the boiler at the top of the boiler chamber.

4. Apparatus according to claim 1, wherein the line downstream from the discharge valve has a reduced diameter thereby minimizing the amount of steam produced in said line when the discharge valve closes.

5. Apparatus according to claim 1, said apparatus being constructed and arranged to maintain the brewing temperature at about 210° F., said piston developing a peak pressure of about 60 p.s.i. during its pumping stroke.

6. In apparatus for brewing hot coffee from liquid permeable pods of dense compressed, finely ground beverage material, said pods being carried in spaced relation along a tape, said apparatus comprising a pair of brewing members arranged for relative movement toward and away from a position of engagement with one another in which they cooperate to define a beverage extraction chamber, one of said members having an inlet port for the introduction of hot water thereinto and the other having an outlet port of relatively small diameter for the discharge of extract therefrom, means for indexing successive pods between said relatively moveable members; a positive displacement pump, a water line adapted to be connected to an outside source of water under line pressure, a valve in said line for connecting said source to said pump, control means for operating said valve to admit a cup-sized quantity of water to said pump, a boiler, means including said valve for connecting said pump to said boiler, a heater in said boiler for maintaining a supply of water at a temperature above its boiling point and a pressure above atmospheric, means for operating said valve to connect said pump and said boiler when the pump is filled with water, an outlet line connecting the boiler with the extraction chamber inlet port, a discharge valve in said outlet line, means for opening the valve when said brewing members are in said position of engagement, means for thereafter operating said pump to force hot water in said boiler through said outlet line, and pressure control means in said extraction chamber for maintaining the pressure therein at a level substantially above atmospheric during an extraction operation.

7. Apparatus according to claim 6, wherein said pressure control means includes each successive pod positioned between said moveable members.

References Cited

UNITED STATES PATENTS

| | | | |
|---|---|---|---|
| 3,046,869 | 7/1962 | Reynolds | 99—289 |
| 3,143,954 | 8/1964 | Nesmith | 99—289 |
| 3,209,676 | 10/1965 | Zimmermann et al. | 99—289 |
| 3,229,612 | 1/1966 | Brown | 99—282 |
| 3,327,613 | 6/1967 | Davis | 99—282 |

WILLIAM I. PRICE, *Primary Examiner.*